US012462204B2

(12) United States Patent
Herron et al.

(10) Patent No.: US 12,462,204 B2
(45) Date of Patent: Nov. 4, 2025

(54) VEHICLE JOURNEY MANAGEMENT SYSTEM

(71) Applicant: GRID SMARTER CITIES LTD, Newcastle Upon Tyne Tyne and Wear (GB)

(72) Inventors: Neil Andrew Herron, Newcastle upon Tyne and Wear (GB); Julian Wrigley, Newcastle upon Tyne and Wear (GB)

(73) Assignee: GRID SMARTER CITIES LTD (GB)

( * ) Notice: Subject to any disclaimer, the term of this patent is extended or adjusted under 35 U.S.C. 154(b) by 0 days.

(21) Appl. No.: 18/280,127

(22) PCT Filed: Mar. 2, 2022

(86) PCT No.: PCT/GB2022/050548
§ 371 (c)(1),
(2) Date: Sep. 1, 2023

(87) PCT Pub. No.: WO2022/185052
PCT Pub. Date: Sep. 9, 2022

(65) Prior Publication Data
US 2024/0070579 A1    Feb. 29, 2024

(30) Foreign Application Priority Data
Mar. 2, 2021    (GB) .................................. 2102919

(51) Int. Cl.
  *G06Q 50/40*    (2024.01)
  *G06Q 10/02*    (2012.01)
  *G06Q 10/0631*  (2023.01)
  *G06Q 10/0832*  (2023.01)

(52) U.S. Cl.
CPC ....... *G06Q 10/06312* (2013.01); *G06Q 10/02* (2013.01); *G06Q 10/06313* (2013.01); *G06Q 50/40* (2024.01); *G06Q 10/0832* (2013.01); *G06Q 2240/00* (2013.01)

(58) Field of Classification Search
CPC .. G06Q 10/06312; G06Q 50/40; G06Q 10/02; G06Q 10/06313; G06Q 10/0832; G06Q 2240/00
USPC .................................................... 705/5
See application file for complete search history.

(56) References Cited

FOREIGN PATENT DOCUMENTS

EP    2711881 A2 *   3/2014   ............. G06Q 50/10

OTHER PUBLICATIONS

"Smart Parking Reservation System using Short Message Services" Published by IEEE (Year: 2010).*

* cited by examiner

*Primary Examiner* — Zeina Elchanti
(74) *Attorney, Agent, or Firm* — The Belles Group, P.C.

(57) ABSTRACT

Method of operating vehicle management systems are disclosed in particular for the delivery of goods which potentially degrade during a journey for example concrete. The method includes registering a different delivery time slots for multiple vehicles to a location. Using GPS to determine the locations of the vehicles on their journeys and estimating the expected arrival times at the delivery location for the vehicles. If one vehicle will be late and another will be early swapping the delivery time slots and if the one vehicle has goods which, from monitoring a variable of the goods, can be seen to be unsuitable for delivery within the time delivery window for that vehicle, swapping the time delivery slot with another vehicle by directing that vehicle to a holding area.

10 Claims, 6 Drawing Sheets

VEHICLE JOURNEY MANAGEMENT SYSTEM

CROSS-REFERENCE TO RELATED PATENT APPLICATIONS

The present application is a U.S. national stage application under 35 U.S.C. § 371 of PCT Application No. PCT/GB2022/050548 filed Mar. 2, 2022, which claims priority to United Kingdom Patent Application No. 2102919.4 filed Mar. 2, 2021. The disclosures of all the aforementioned patent applications are incorporated herein by reference in their entireties, for all purposes.

The present invention relates to a vehicle journey management system, and relates particularly, but not exclusively, to a method for controlling delivery bookings for premises with limited access and parking controls, which could include off-street private and public car parks or private loading bays and serving stores.

Booking systems for allowing a vehicle to park in an area for a specified period of time are well known. These systems are used in major cities to enable vehicles to park near a building such as a shop, office or construction site to unload or pick up goods whilst attempting to maintain a flow of traffic. Systems such as this include KERB™ along with other vehicle apps that only deal with parking availability but not booking. The time slots allow for efficient time handling in areas where traffic levels are high and limitations are placed on a vehicle's right to stop. However, allocating times for vehicles in these busy areas can become problematic if a vehicle is running late due to heavy traffic or arrives unexpectedly early. In these situations a vehicle running late would either have a limited time left to park and commence its service or will have to re-book another slot. If a vehicle has arrived early they either have to park at a different destination and wait, or drive around in circles whilst waiting for the parking area to become free.

Both of these situations are neither financially nor time beneficial. Driving around whilst waiting for the parking slot costs extra money in fuel and may result in the user ultimately becoming late if traffic levels increase in the area. This in turn has a detrimental environment impact due to the increased emissions produced by the extended driving. If the vehicle is inevitably too late for the booked slot the time and fuel wasted for the journey can be problematic as it can impact on vehicle arriving for subsequent slots.

A further related problem comes when the goods being carried on a vehicle have time delivery window, that is a time in which they must be delivered in order to be suitable for use. An example of such goods is concrete. There is often debate about the time limit between placing fresh concrete against fresh concrete already placed and compacted in order to minimise the risk of a cold joint being formed.

By way of example of relevant legislation, in the UK, the Specification for Highway Works clause 1710 part 3 takes a rigid approach in stating:

"Fresh concrete shall not be placed against in situ concrete that has been in position for more than 30 minutes unless a construction joint is formed . . . ."

British Standard 8500-1 Concrete—Complementary British Standard to BS EN 206, clause A.9.1 takes a more flexible approach in stating:

"Concrete should be placed into its final position as soon as practicable. Extended delays in placing can lead to a significant loss of consistence with time making it impossible to place with satisfactory compaction. Where there is an extended delay between the placement of one layer of concrete and the following layer then there may be a cold joint between layers. For this to occur the delay should be sufficient for the lower layer to develop an initial set or harden. The time for this to occur depends on the concrete temperature, cement type, mix proportions, the use of admixtures with set retarding properties and consistence of the concrete."

BS 8500-2 requires concrete to be delivered "within 2 h after the time of loading where transported in truck mixers or agitators or within 1 h after the time of loading where non-agitating equipment is used, unless a shorter time is specified or a longer time permitted by the specifier. These limits are sufficient for normal UK temperatures."

It can therefore be seen that ensuring prompt delivery of concrete and similar good is important to ensuring good construction. However, the time of delivery often outside of the control of both drivers and site managers.

Preferred embodiments of the present invention seek to overcome or alleviate the above described disadvantages of the prior art.

According to an aspect of the present invention there is provided a method of operating a vehicle journey management system, comprising the steps:

registering a first time slot to a first vehicle in a booking system to park in a parking area;

registering a second time slot, later than said first time slot, to a second vehicle in the booking system in said parking area;

determining the location of the first and second vehicles; estimating respective expected arrival times for the first and second vehicles at the parking area based on their location; and if the first vehicle will be late for the first time slot by a first predetermined time period and the second vehicle will be early for the second time slot by a second predetermined time period, according to the estimated arrival times, automatically change the allocated time slot for the first vehicle to the second time slot and the time slot for the second vehicle to the first time slot.

The ability to automatically change the booked time slots provides a time efficient and cost effective way to alleviate difficulties that arise when vehicles are early or late for their booking. This reduces time wasted for both vehicles involved and therefore reduces fuel consumption and cost. Furthermore, this decreases the amount of traffic in the area and inevitably reducing the environmental impact and carbon footprint for the delivery/pickup services.

In a preferred embodiment of the present invention when registering a time slot it can be performed by automatic allocation of a time slot or by a user selecting a time slot.

This gives flexibility to both the user and the booking system dependant on the type of booking.

In a further embodiment the positional information is determined by a global navigation satellite system or global positioning system.

Using systems such as these provides a higher degree of accuracy when determining positional information. This in turn establishes a higher degree of accuracy of journey times based on the consuming of real-time GPS location data. The more accurate the location data the more accurate the calculation of the journey time.

Another preferred embodiment of the present invention is where the user has an application on a mobile device allowing the user to register a booking slot and, a central processing unit located in a central server, wherein the application and the server can transmit and receive data therein.

In a preferred embodiment of the present invention there is a priority list that is checked, wherein the priority list is a directory of vehicles whose allocated times cannot be changed.

For certain types of vehicles delivery must be made as soon as possible and delays have a negative impact on the goods being delivered. For example, cement mixer vehicles which deliver premixed cement and concrete must make their delivery before the material sets hard and therefore delays must be avoided.

A further embodiment of the present invention where the priority list includes construction vehicles live animal transportation vehicles, medical supply and vaccine transportation vehicles and chilled/frozen produce.

This allows for an override feature when vehicles such as construction vehicles cannot have their booking slot swapped. A permissions hierarchy can be created to add a condition precedent to the spatial and temporal element. The same principle could be applied to time or temperature dependent vaccines versus general pharmaceutical deliveries, for example.

According to another aspect of the present invention, there is provided a method of operating a vehicle management system, comprising the steps:
  registering a first time slot to a first vehicle in a booking system to park in a first parking area, wherein the first vehicle is transporting goods that have a time delivery window;
  registering a second time slot to a second vehicle in the booking system in said first parking area;
  determining the location of the first vehicle;
  measuring at least one variable of said first vehicle or the goods therein;
  recalculating the time delivery window for the first vehicle dependent on said at least one variable;
  estimating the respective expected arrival times of the first vehicle to arrive at the first parking area based on its location; and
  if the recalculated time delivery window for the first vehicle does not match the first time slot but the estimated arrival time matches the second time slot, reallocate the first vehicle to the second time slot.

By also monitoring a variable relating to the quality of the goods on the vehicle it is possible to determine whether delivery arrangements should be altered on the basis of the quality of the goods in the vehicle. In particular, where the quality of goods is depreciating quickly it is possible to ensure that a delivery slot is available for those goods within a window in which the goods remain in acceptable quality.

The method may further comprise allocating another time slot to said second vehicle.

In a preferred embodiment the other time slot is said first time slot.

In another preferred embodiment allocating a second parking area to said second vehicle so that the second vehicle can wait for said other time slot.

In a further preferred embodiment registering a time slot can be performed by automatic allocation of a time slot or by a user selecting a time slot.

The position information may be determined by a global navigation satellite system or global positioning system.

In a preferred embodiment the user has an application on a mobile device allowing the user to register a booking slot and, a central data processor located in a server, wherein the application and the server can transmit and receive data therein.

Preferred embodiments of the present invention will now be described, by way of example only, and not in any limitative sense with reference to the accompanying drawings in which.

Figure 1:
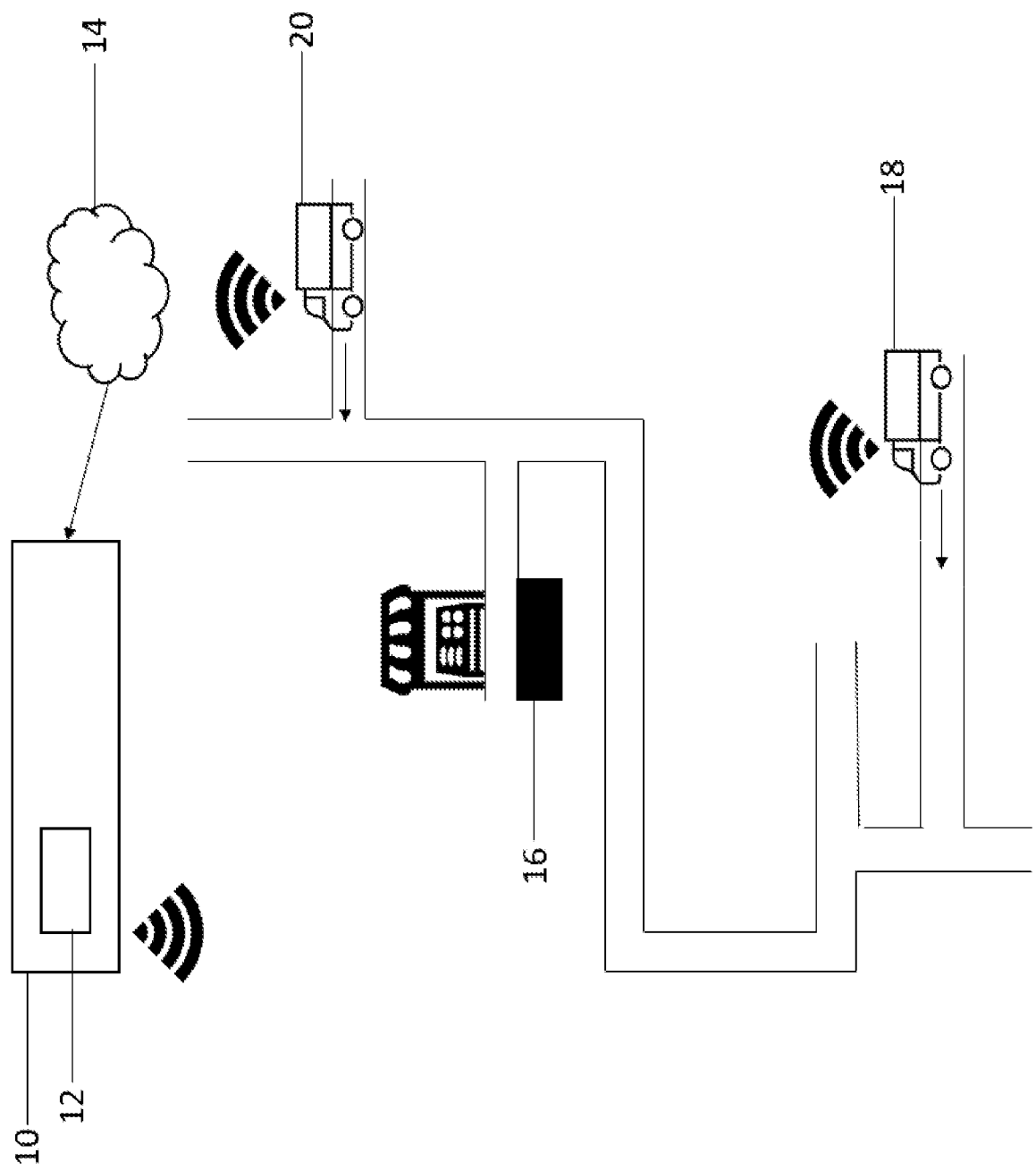
FIG. 1 shows an example vehicle journey management system with server and cloud network of the present invention.

With reference to FIG. 1, a method for operating a vehicle journey management system utilises a central server 10 with a central processing unit 12 and cloud computing server 14. A user of the booking system uses a mobile device capable of downloading the booking system application, accessible in their vehicle. The application enables the user to access the register of times slots available for a particular parking bay 18. The parking area in the form a parking bay 18 will usually be near to or adjacent a shop, restaurant, or premises that requires a service typically loading or unloading a delivery and can be a marked parking bay, whether on or off-street, or can be a virtual parking bay which is defined area or roadway adjacent the kerb, which is defined as a parking area but is not marked visibly.

The vehicle management system is primarily for the purpose of coordinating the delivery of good, and the like, including, but not limited to construction vehicles, live animal transportation vehicles, medical supply and vaccine transportation vehicles and chilled/frozen produce delivery vehicles.

Once the user (fleet manager, driver or administrator) has logged into the application, they input their vehicle registration number and see which time slots are available to book. The user either books a specific time slot for their vehicle or lets the application allocate a time slot for them. This data is then sent from the booking device, a handheld device or larger desk based device) to the cloud 14 to be further processed in the central server 10.

Figure 2:
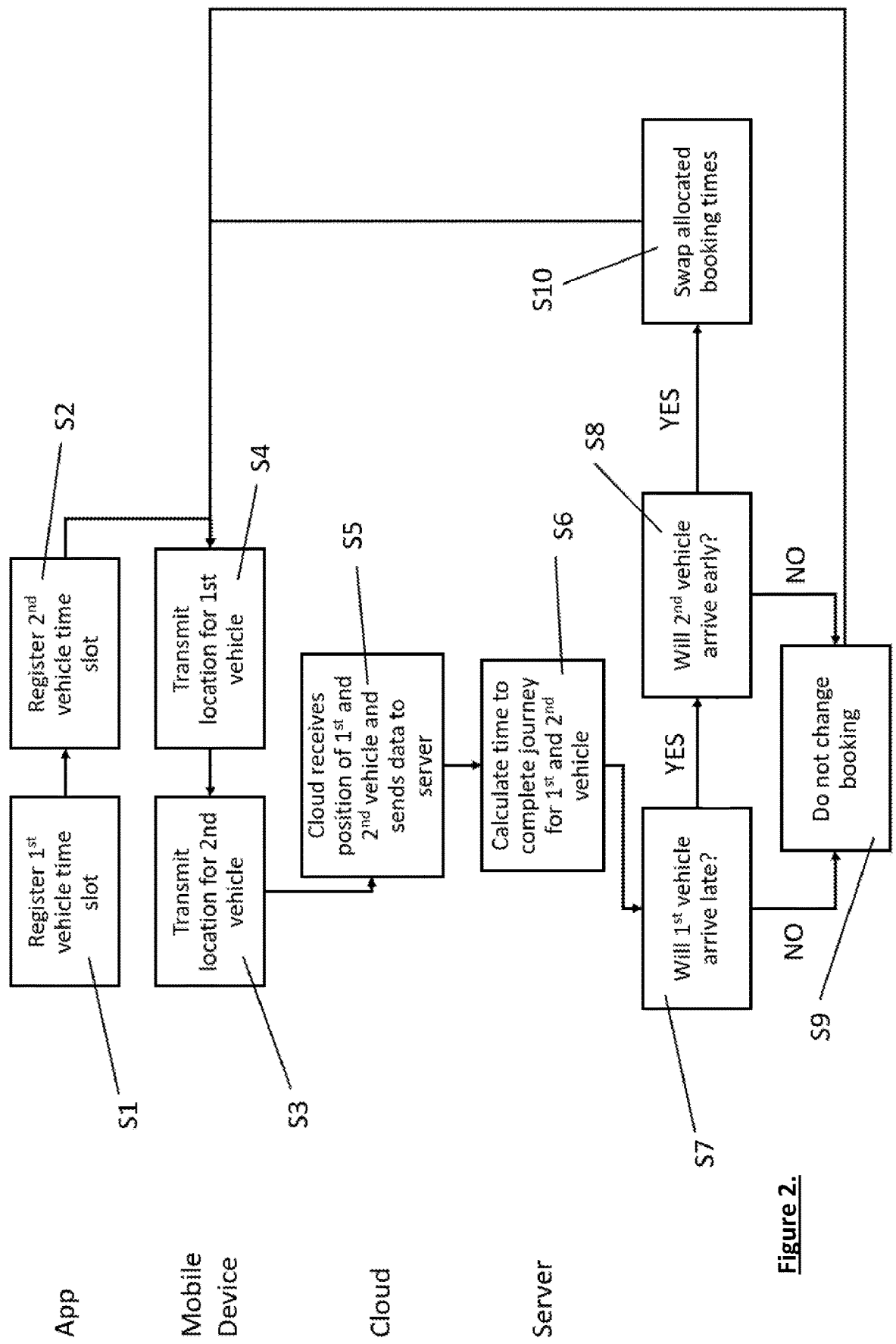
FIG. 2 is a flow diagram of the present invention.
Figure 3:
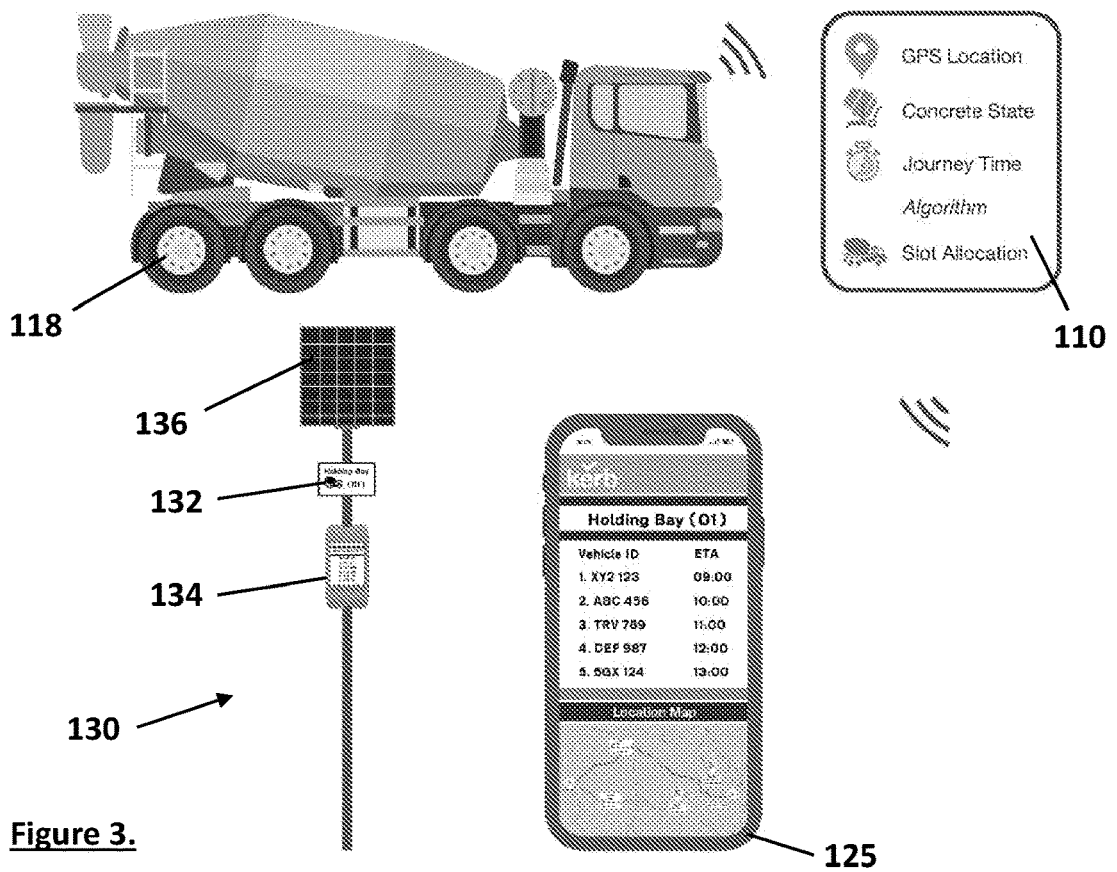
FIG. 3 is an image showing components used in method of the present invention.

The steps used for operating the vehicle journey management system utilises automatic changes in a booking system and will now be described, with additional reference to FIG. 2. A user registers a first time slot for a first vehicle 18 designated to a parking bay 16 from their mobile device (step S1). A second user then books a second time slot for a second vehicle 20 designated to the same parking bay 16 (step S2). The first vehicle 18 and the second vehicle 20 have adjacent time slots with the first vehicle having the earlier slot. From both mobile devices the application sends a data package of the vehicle's location to the cloud 14 (steps S3 and S4). This information is then transmitted to a central server 10 (step S5) where the CPU 12 uses the location of the vehicle to calculate likely journey time to the parking bay (step S6). This is achieved using an algorithm stored within the CPU. Other data that can be taken into account to provide an accurate measure of time is level of traffic in areas the vehicles will be travelling through, average speeds on specific roads or construction/traffic accident delays. Once a time is calculated, the data is transmitted, via the central server 10, and is received by the relevant mobile device. This data is then displayed on the booking system application for the user to see. This lets the users know how long their journey will take from their current location to the designated parking bay 16. Such information can be transmitted and received using various methods such as General Packet Radio Services (GPRS), Global Navigation Satellite System (GNNS) or a radio frequency (RF) module. The ideal scenario would be the transmission of per second or fraction of per second updated location data in real-time as more vehicle's 'connect' and more calculations are required the more relevant and necessary reduced latency would be.

For a booked slot there is an estimation of the time from current location to the delivery location. For example, if a delivery is the first one of a series the calculation is from the depot to delivery location. However, if the delivery is a subsequent drop and it is the next drop where the arrival time is booked, the system assesses the location of the deliveries required before the delivery in question, since the location alone may give the wrong impression of the time to delivery. If it just looks at vehicle proximity then a vehicle with multiple drops in a small area may be perceived to be close but it may be running late as it has two drops before the booked one in question.

During the progression of the journey each vehicle sends and receives data from the server 10 repeatedly. This allows the server to access live feeds from the vehicles and therefore constantly predict the time each vehicle will take to reach their destination.

In the event that either the first vehicle is going to arrive late by a predetermined period of time (step S7) or the second vehicle will arrive early by a predetermined period of time (step S8), according to the estimated time to be taken, the central server 10 checks the status of the other vehicle. If the first vehicle will arrive early but the second vehicle is still on record to arrive on time, no action is taken (step S9). However, if the second vehicle is expected to arrive early by a predetermined amount of time, the central server 10 will swap the time slots for the first and second vehicle (step S10), that is the first vehicle will take the second time slot and the second vehicle takes the first time slot. This can be clearly seen in FIG. 1, wherein the second vehicle 20 will arrive at the parking bay 16 before the first vehicle 18, who is running late. Therefore, in this situation the time slots will be swapped.

The predetermined period of time depends on the length of time between the two time slots and is typically at least half of that time. For example, if the first time slot is set at 1 pm and the second time slot is set at 1:30 pm, then a swap is only undertaken if the first vehicle is expected to arrive at least 20 minutes late and the second vehicle is expected to arrive at least 20 minutes early.

Whilst one vehicle is not going to arrive on time the central server 10 constantly monitors the other vehicle for changes and if, with time, the other vehicle is delayed or will arrive early the bookings will be swapped.

This system is very effective for swapping booked times with vehicles whose deliveries or pick ups are not urgent. However, this system can be over-ridden if one or both vehicles are reviewed as priority vehicles. Priority vehicles are of the type whose time slots are longer than the average or have cargo that cannot be delayed for delivery/pick-up. An example of such a vehicle is a cement lorry that is delivering to a construction site.

A second aspect of the present invention will now be described with reference to FIGS. 3 to 9 in which features in common with those of FIGS. 1 and 2 have been indicated with like reference numerals increased by 100. This aspect of the invention utilises technology previously described but specifically relates to a situation where the goods being delivered have a time critical feature which requires the goods to be delivered within a certain period of time or dependent on certain conditions of the product. For example, a delivery of concrete must arrive on site before it has proceeded too far through the setting process. Furthermore, this setting process is dependent on various variables including, but not limited to, the ingredients used to form the concrete, the temperature and the humidity. On a very hot day the concrete may set quicker than expected and this varies the ideal time for a delivery to be made. Similarly, certain foodstuffs must be stored at or close to an ideal temperature to remain fresh. This is typically chilled relative to the external temperature and can generally be controlled by using refrigerated transport. However, in the event that the refrigerated transport fails an additional urgency to the delivery as required. As a result, many products such as concrete and food stuffs have a time delivery window. Typically, this means that if goods are delivered after a certain time will be unsuitable for use. However, for some goods it is possible that delivery to early is a problem also. Livestock are also transported with a time delivery window, that is, the animal cannot remain on a vehicle for too long. However, on hot days this period should be shorter due to prevent overheating of the animals.

These factors, particularly temperature, are easily measured. The temperature is measured by the temperature of the goods or alternatively the temperature of a portion of the vehicle. For example, one or more thermometers are located in the goods or thermometers are used to monitor the temperature of the goods carrying portion of the vehicle, particularly in refrigerated vehicles. Similarly other variable, including but not limited to, air humidity, water content of the good and rotational speed of the mixer (in the case of a cement lorry). This monitoring of the product, environment or vehicle is used to determine the state of the goods and to calculate any variations in the time delivery window.

This monitoring is therefore integrated into a method similar to that set out above as follows. A first vehicle is carrying goods, such as concrete, which has a time delivery window. The vehicle management system is used to register the first vehicle into a first time slot for a parking area. This parking area can be a delivery location or can be a holding bay adjacent to the delivery location in which a vehicle may temporarily wait until the delivery location is free for the delivery to be made. Specifically it includes, but is not limited to:

an off-street holding area (for dedicated use by the development site). This could be private land/re-purposed local authority land such as a car park, depot or even derelict or unused land.

an area of the development site dedicated as a holding area.

an area of on-street which has been re-purposed by the authority for site use by means of a Temporary Traffic Regulation Order and used as a dedicated holding area.

an area of pre-approved and risk assessed kerb space to be used 'in-extremis', that is, for a short period of time as a dispensation or waiver for a particular vehicle type but not repurposing completely. This would be a Virtual Loading Bay/Virtual Holding Bay, that is an area not marked on the road as a parking allowed space but known to be usable at specified times for a specified vehicle as logged in the record system.

A second vehicle, which may or may not be carrying goods with a time delivery window, also registers to use the parking area at a second timeslot different from the first timeslot.

The first and second vehicles then set off on their journeys to the parking area at times appropriate to allow them to arrive in their allocated timeslot. During the course of their journeys the location of the first and second vehicles is repeatedly determined, typically using GPS location calculating systems. Using this location data, it is possible to estimate the journey time from the present location of each vehicle to their destination.

At the same time, the measurable variable of the goods which is used to determine the time delivery window is measured and this is used to recalculate the time delivery window for the goods in the first vehicle. If the recalculated time delivery window for the goods in the first vehicle does not match the first timeslot, that is there is not sufficient time to undertake the delivery within the time delivery window, then the first vehicle is allocated a timeslot which both matches the estimated time of arrival of the vehicle based on its location and matches the requirements for the time delivery window. In this example, this timeslot is the second timeslot and the second vehicle is then allocated the first timeslot. In real examples there are multiple vehicles allocated to multiple timeslots and the second timeslot is simply the one which best matches the estimated arrival time and time delivery window of the first vehicle.

In some circumstances however it may not be possible to simply swap one timeslot for another and it may be that multiple timeslot registrations for multiple vehicles need to be reallocated based on their estimated times of arrival and the goods contained therein.

Figure 4:
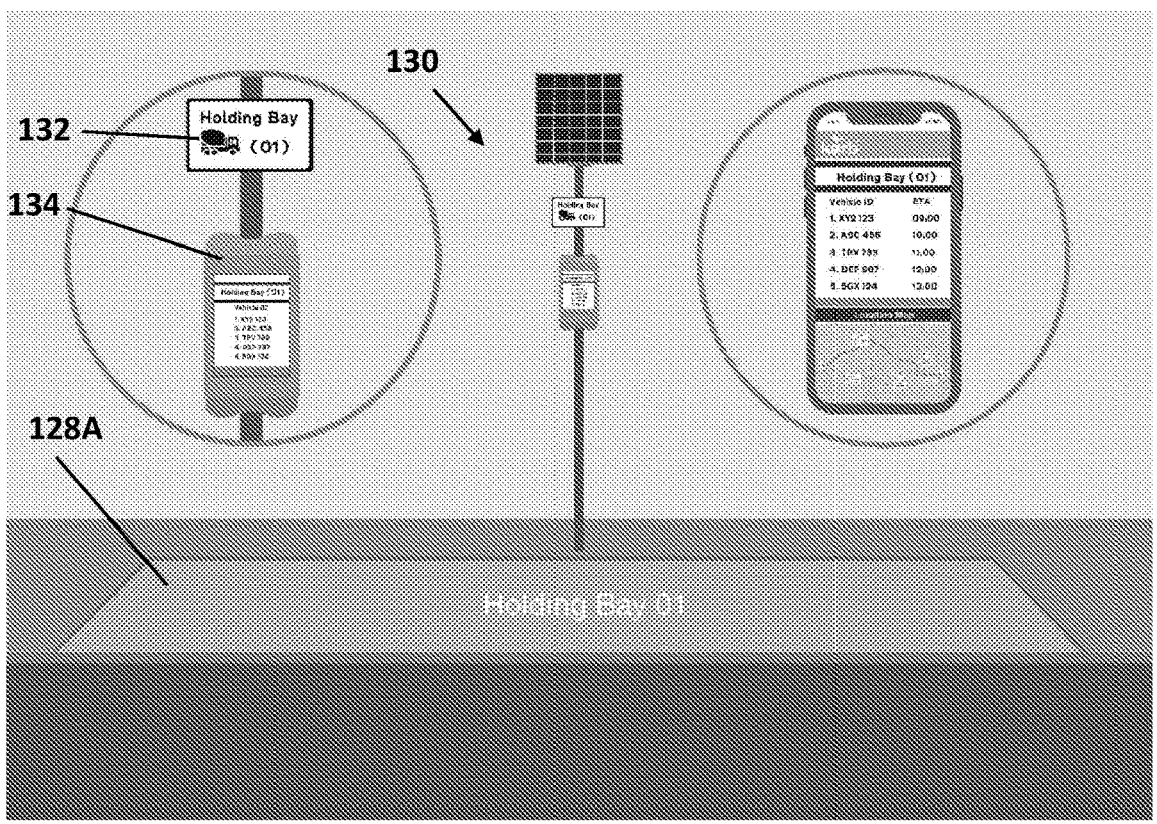
FIG. 4 is an image of a holding bay/parking location used in the method of the present invention.
Figure 5:
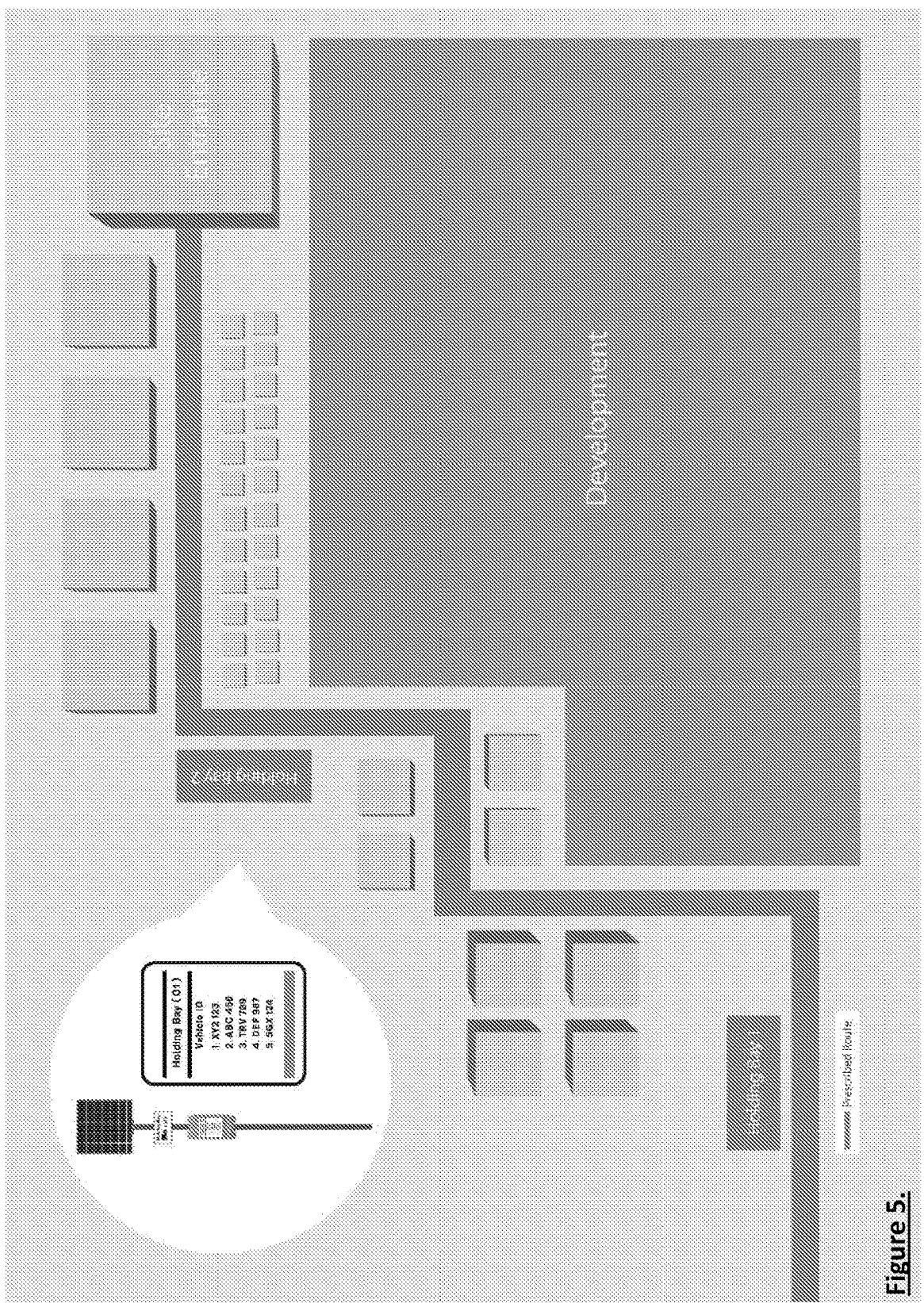
FIG. 5 is a schematic representation of a typical delivery location where the invention of the present invention might be used.
Figure 6:
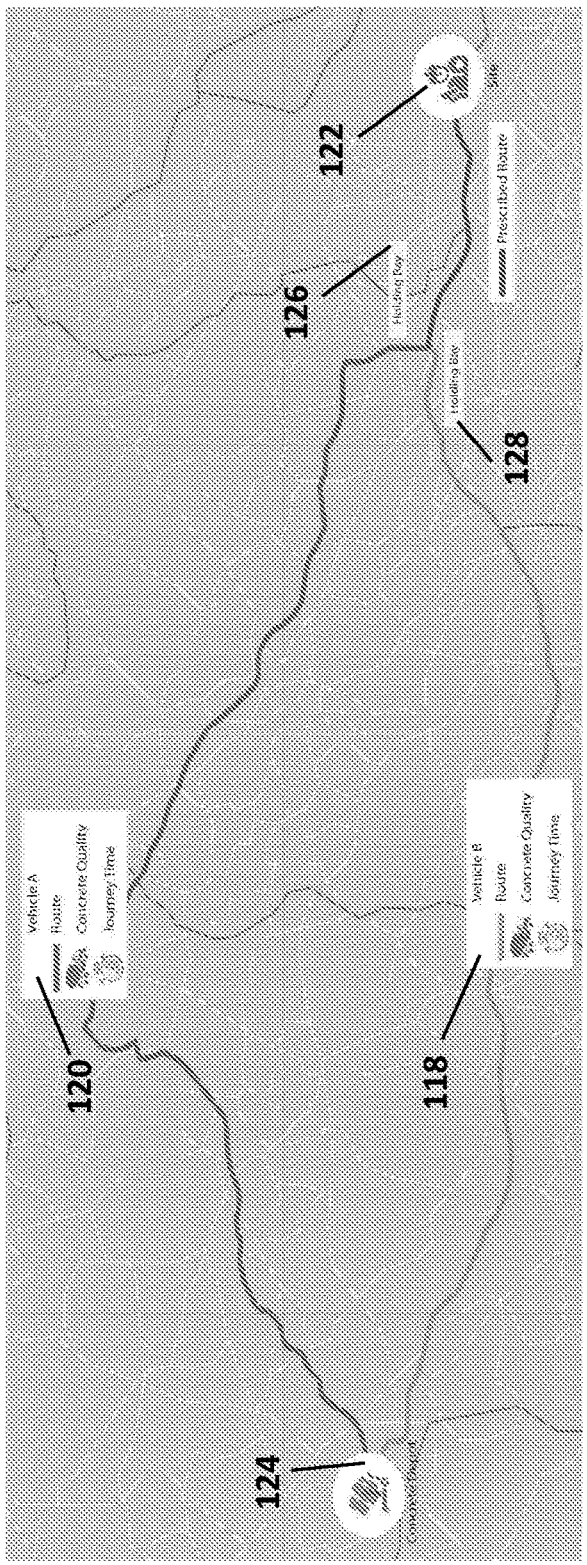
FIGS. 6 and 7 are maps illustrating the use of the method of the present invention.
Figure 7:
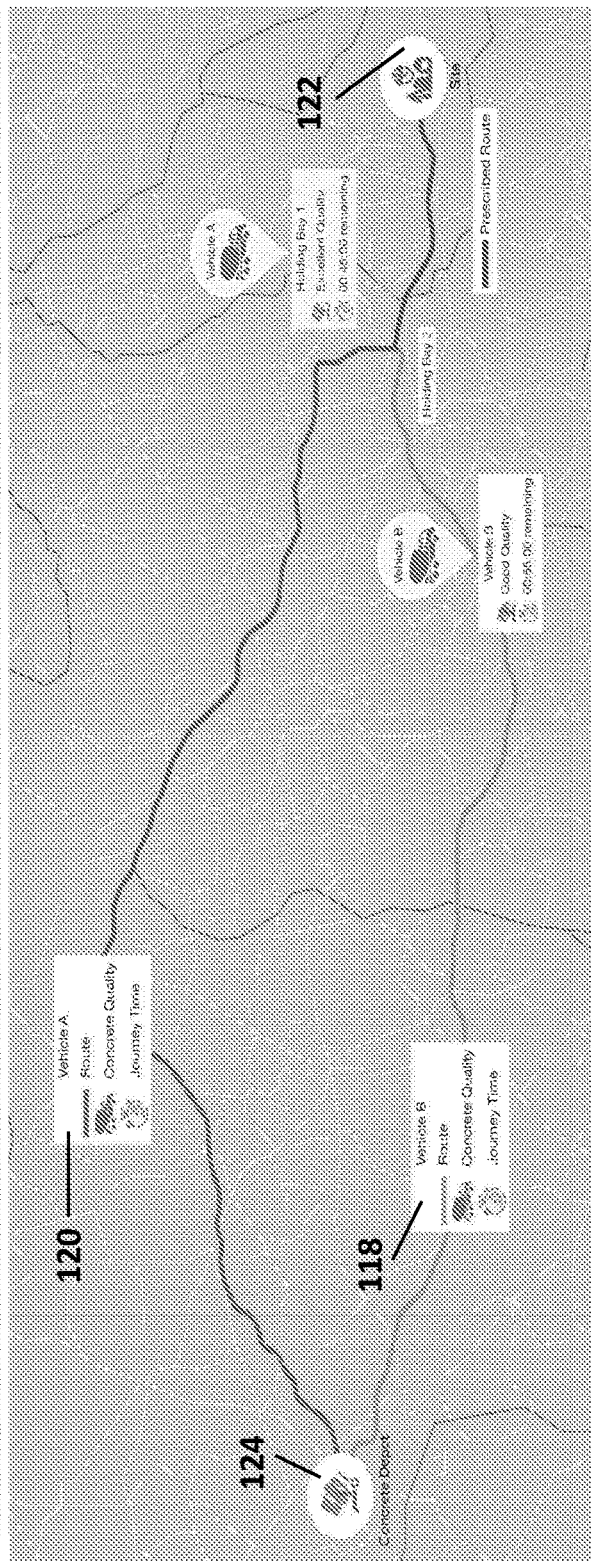
Figure 8:
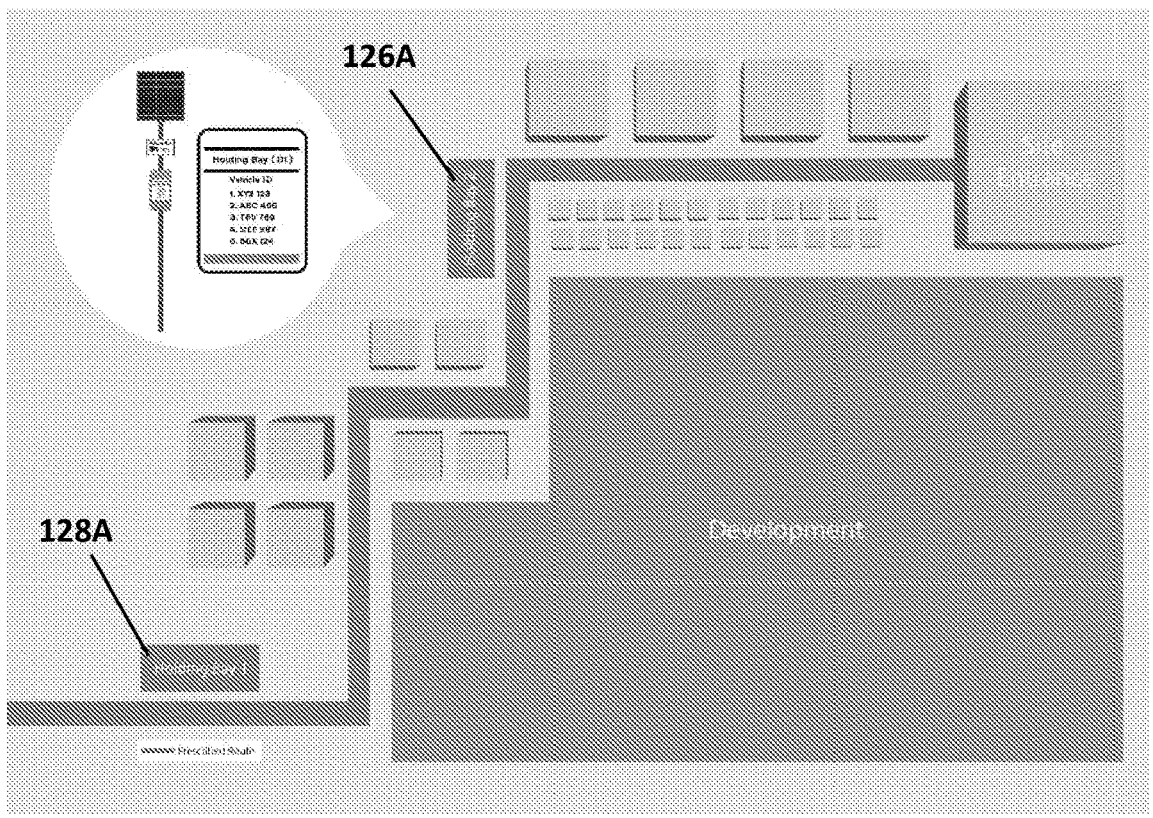
FIGS. 8 and 9 are sites maps illustrating another use of the present invention.
Figure 9:
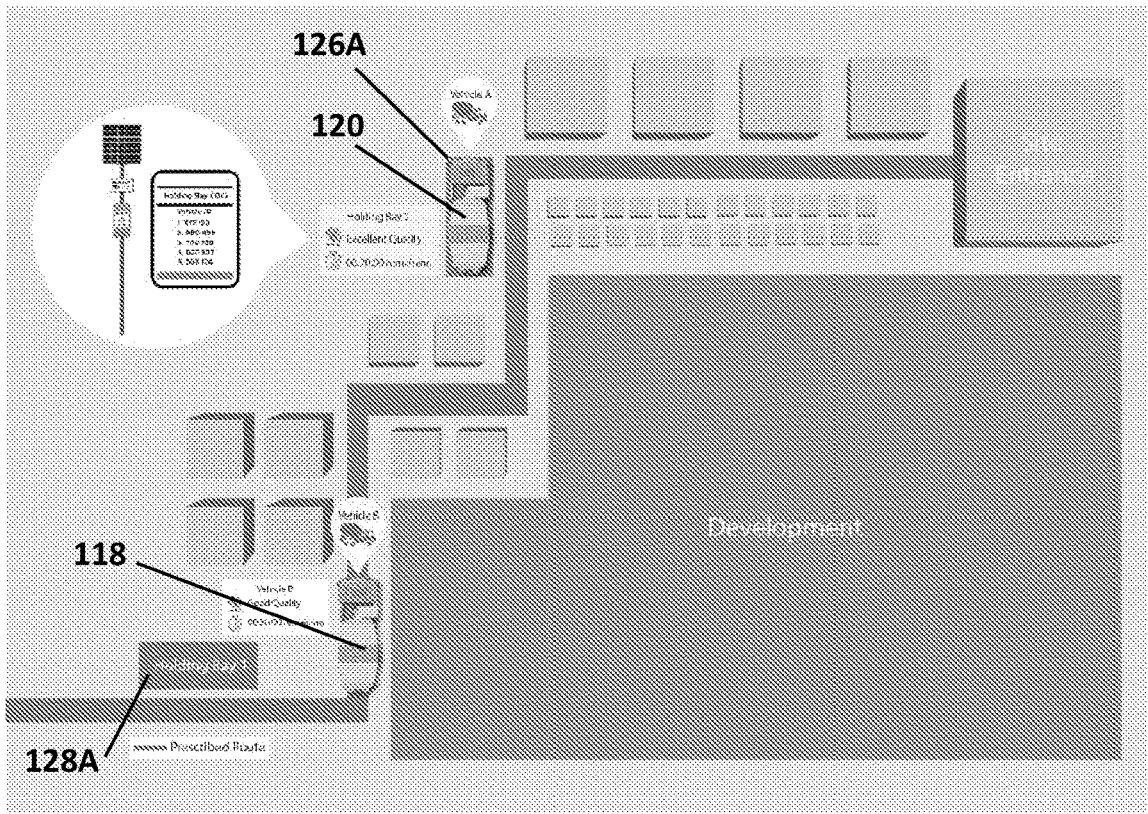

FIGS. 3 to 9 illustrate an example of the above invention utilising a cement lorry 118 as the first vehicle which is delivering a consignment of premixed concrete to a site 122 from a starting location in the form of a concrete depot 124. The cement lorry is in data communication with the server 110 sending location data and data relating to the quality of the concrete. Specifically, a monitoring device is measuring a variable of the cement and transmitting that data to the server. The driver of the vehicle also uses a handheld device, typically a mobile phone, PDA or handheld computer device 125, to run the application which gathers location data and sends it to the server 110. This data is used to estimate the remaining journey time to the destination and the time delivery window for the concrete. In FIGS. 6, 7 and 9 the cement lorry 118 is a first vehicle (maintaining the language used in the appended claims) and is labelled as vehicle B. A second vehicle, and in this case a second cement lorry 120, is labelled as vehicle A. It is commonplace that a series of cement lorries are dispatched from the depot 124 with the intention that they arrive one after another with a short interval between each delivery. This is necessary where a large volume of concrete is required beyond the capacity of a single lorry and may be from a single supply depot or from multiple depots. A schedule of arrivals is created with different vehicles prescribed different times with vehicle A (120) and vehicle B (118) being allocated to such timeslots. The concrete in each vehicle has a time after which it will not be suitable for use this therefore creates a time delivery window within which the goods, the concrete, should or must be delivered. A time delivery window as a start and an end time. This is an earliest possible delivery time and a latest possible delivery time. In the case of most goods, including concrete, there is no earliest possible time or in other words the start time is immediately.

In FIG. 6 the vehicles 118 and 120 have left the concrete depot 124 and are heading to the delivery location 122. The vehicles are following different routes and it is possible to use the apparatus of the present invention to ensure that the vehicles stick to prescribed routes which have been allocated, by an authorising body such as a local government department, as allowable routes for use by the cement lorries from the depot 124 to the site 122. Because the two vehicles are using different routes the journey times vary meaning that the vehicles may not arrive at the required time for delivery and this would also be the case for vehicles travelling from different depots. As a result, a pair of holding bay is labelled 126 and 128 are provided towards the site end of the journeys taken by the two vehicles. If either vehicle is going to arrive before the timeslot allocated then a holding bay can be allocated to that vehicle where the vehicle can wait until it is a suitable time for the vehicle to carry on the journey to the site so as to arrive within its allocated timeslot.

However, a more complex situation is where the quality of concrete is, or becomes, different in the two vehicles as monitored by the monitoring equipment in the vehicle. In the example shown, vehicle A is scheduled to arrive first and its concrete is in excellent condition. At the same time, vehicle B, which is scheduled second, is carrying concrete in a less good condition ("good" as opposed to "excellent"). As a result, for vehicle B, the time delivery window is no longer matching or overlapping with the timeslot allocated to vehicle B. As mentioned above, it is standard practice that vehicle B is likely to arrive earlier at the site than the first allocated time slot and would normally therefore wait in "Holding Bay 2" 128. However, since the quality of the concrete in vehicle B is not as good as in vehicle A, the allocated timeslots are swapped. Vehicle A is then held in the "Holding Bay 1" 126 for a longer period than previously expected so that vehicle B is able to deliver the concrete therein before its quality decreases too far. Vehicle A then makes its delivery in the second time slot.

A similar scenario is set out in FIGS. 8 & 9. The site 122 is shown in FIG. 5 and has a pair of on-site holding bays 126A and 128A. The "Holding Bay 1" is shown in FIG. 4 and includes signage 130 which comprises a fixed sign 132 and a changeable sign 134 which is an e-ink display powered by a solar panel 136 and which is in data communication with the server 110 which processes all of the data. The holding bays 126A and 128A are used in the way described above for FIGS. 6 and 7, with the difference being the distance to the site entrance being significantly shorter. In the event that the first and second time slots need to swap this updated information is communicated to the changeable sign 134 and is displayed thereon. The application running on the mobile phone or handheld computer device 125 communicates the updated use of the holding bay and may update the destination location in the mapping part of the application being used to provide directions to the driver.

Although this aspect of the present invention has been described as being separate from the aspect previously described, it will be immediately apparent to persons skilled in the art that there is significant overlap between these systems and as features of the first aspect can be mixed and integrated with features of the second aspect.

It will also be appreciated by persons skilled in the art that the above embodiments have been described by way of example only and not in any limitative sense, and that various alterations and modifications are possible without departure from the scope of the protection which is defined by the appended claims. For example, the central server 14 could be replaced with further adaptations to the application itself. For example, the application, which is installed on the mobile device, would have an inner algorithm capable of calculating the given time to the destination. The mobile device would be able to transmit and receive this information from other vehicles and therefore make the booking swaps via each application.

A further example is the user can book a slot in the system by using a computer such as a desktop, laptop or tablet instead of a mobile device. Additionally, the user could use an off integration into an on-board navigation system, a PDA (personal digital assistant) or an integration into a head's up or on-screen display.

Another example would be the use of a 5G or a faster connected network, as will the use of IoT fixed position connected devices such as the connected smart signs to improve dead-reckoning by creating a networked mesh of triangulation options performing GPS improvement calculations in real time. This would also obviate any latency issues with slower networks like 3G and 4G. A further example includes the application's software being automated and integrated into any routing or scheduling software.

The invention claimed is:

1. A method of operating a vehicle management system performed by a computing device, the method comprising:
    registering a first time slot to a first vehicle as a first input to a booking application configured on the computing device to park in a first parking area, wherein the first vehicle is transporting goods that have a time delivery window;
    registering a second time slot to a second vehicle as a second input to the booking application in said first parking area;
    receiving location information in electronic data form as a third input to the booking application of the first vehicle from a global navigation satellite system or global positioning system;
    receiving, as a fourth input to the booking application, at least one variable of said first vehicle or the goods therein in electronic data form, wherein the variable is measured by a sensor and compared against a predetermined standard to determine a condition of the goods to be delivered;
    recalculating, by a processor of the computing device, the time delivery window for the first vehicle based, at least in part, on the condition of the goods to be delivered;
    estimating, by the processor of the computing device, the respective expected arrival times of the first vehicle to arrive at the first parking area based on its location;
    automatically reallocating, by the processor of the computing device, the first vehicle to the second time slot upon the recalculated time delivery window for the first vehicle being determined, by the processor of the computing device, to not overlap the first time slot and the estimated arrival time being determined, by the processor of the computing device, to overlap the second time slot; and
    automatically communicating, by the processor, data indicating the reallocation to a user device having a display, the user device automatically displaying the data to a user on the display.

2. The method of claim 1, further comprising allocating another time slot to said second vehicle.

3. The method of claim 2, wherein said other time slot is said first time slot.

4. The method of claim 1, further comprising allocating a second parking area to said second vehicle so that the second vehicle can wait for said other time slot.

5. The method of claim 1, wherein registering a time slot can be performed by automatic allocation of a time slot or by the user selecting a time slot.

6. A method of operating a vehicle management system performed by a computing device, the method comprising:
    registering a first time slot to a first vehicle as a first input to a booking application configured on the computing device to park in a first parking area, wherein the first vehicle is transporting goods that have a time delivery window;
    registering a second time slot to a second vehicle as a second input to the booking application in said first parking area;
    receiving location information in electronic data form as a third input to the booking application of the first vehicle from a global navigation satellite system or global positioning system;
    receiving, as a fourth input to the booking application, at least one variable of said first vehicle or the goods therein in electronic data form, wherein the variable is measured by a sensor and compared against a predetermined standard to determine a condition of the goods to be delivered;
    recalculating, by a processor of the computing device, the time delivery window for the first vehicle based, at least in part, on the condition of the goods to be delivered;
    estimating, by the processor of the computing device, the respective expected arrival times of the first vehicle to arrive at the first parking area based on its location;
    automatically reallocating, by the processor of the computing device, the first vehicle to the second time slot upon the recalculated time delivery window for the first vehicle being determined, by the processor of the computing device, to not overlap the first time slot and the estimated arrival time being determined, by the processor of the computing device, to overlap the second time slot; and
    automatically transmitting, by the processor, data indicative of the reallocation to an electronic-ink (e-ink) display associated with a holding bay, the e-ink display automatically updating its displayed content based on the data.

7. The method of claim 6, further comprising allocating another time slot to said second vehicle.

8. The method of claim 7, wherein said other time slot is said first time slot.

9. The method of claim 6, further comprising allocating a second parking area to said second vehicle so that the second vehicle can wait for said other time slot.

10. The method of claim 6, wherein registering a time slot can be performed by automatic allocation of a time slot or by a user selecting a time slot.

* * * * *